United States Patent
Carter

(10) Patent No.: US 8,698,331 B2
(45) Date of Patent: Apr. 15, 2014

(54) BIDIRECTIONAL AXIAL FLOW TURBINE WITH SELF-PIVOTING BLADES FOR USE IN WAVE ENERGY CONVERTER

(76) Inventor: Richard W. Carter, Kaneohe, HI (US)

(*) Notice: Subject to any disclaimer, the term of this patent is extended or adjusted under 35 U.S.C. 154(b) by 233 days.

(21) Appl. No.: 13/330,917

(22) Filed: Dec. 20, 2011

(65) Prior Publication Data
US 2012/0124986 A1 May 24, 2012

(51) Int. Cl.
*F03B 13/00* (2006.01)

(52) U.S. Cl.
USPC .............. 290/42; 290/43; 290/53; 290/54

(58) Field of Classification Search
USPC .................. 290/42, 43, 53, 54; 60/398
See application file for complete search history.

(56) References Cited

U.S. PATENT DOCUMENTS

| | | | |
|---|---|---|---|
| 1,467,672 A | 9/1923 | Kaplan | |
| 4,045,148 A * | 8/1977 | Morin | 416/84 |
| 4,424,451 A | 1/1984 | Schmidt | |
| 4,996,840 A * | 3/1991 | Marx | 60/507 |
| 5,005,357 A * | 4/1991 | Fox | 60/398 |
| 5,032,057 A | 7/1991 | Speer | |
| 5,193,978 A | 3/1993 | Gutierrez | |
| 5,554,003 A | 9/1996 | Hall | |
| 6,360,534 B1 | 3/2002 | Denniss | |
| 6,833,631 B2 * | 12/2004 | Van Breems | 290/42 |
| 6,948,910 B2 * | 9/2005 | Polacsek | 416/1 |
| 7,931,443 B1 | 4/2011 | Potter | |
| 2010/0290908 A1 | 11/2010 | Denniss | |
| 2011/0103958 A1 | 5/2011 | Arlitt | |
| 2011/0203266 A1 | 8/2011 | Denniss | |

FOREIGN PATENT DOCUMENTS

FR    2580337 A1 *  4/1985

OTHER PUBLICATIONS

Th Kim, "The Optimization of Blade Pitch Settings of an Air Turbine Using Self-Pitch-Controlled Blades for Wave Power Conversion", J Solar Energy 2001;123:382-6, USA.

* cited by examiner

*Primary Examiner* — Tho D Ta
(74) *Attorney, Agent, or Firm* — Leighton K. Chong

(57) ABSTRACT

A bidirectional axial flow turbine with self-pivoting blades is provided for use in a central opening of submerged horizontally-aligned structure forming a wave energy conversion device. Entry and exit inner guide vanes are positioned on opposite sides of the vertically-aligned central opening, for directing the bidirectional fluid flow into and out of the central opening and inducing a vortex swirl in both directions of fluid flow that has the same direction of rotation. Within the opening, a turbine hub is mounted with a plurality of uniformly spaced self-pivoting blades that have a symmetrical blade profile to the bidirectional flow. The self-pivoting blades automatically change their blade angle in response to the force of water flow on the blades, so that they turn the turbine shaft in the same rotational direction in both flow directions.

23 Claims, 11 Drawing Sheets

BIDIRECTIONAL AXIAL FLOW TURBINE WITH SELF-PIVOTING BLADES FOR USE IN WAVE ENERGY CONVERTER

FIELD OF INVENTION

This invention relates to a device for converting the renewable energy source of water waves into usable energy. In particular, it is directed to a bidirectional axial flow turbine with self-pivoting blades for use in a submerged structure of a wave energy conversion device.

BACKGROUND OF INVENTION

Many prior wave energy converters employ additional wave-activated mediums such as air (air-turbine) or hydraulic (hydraulic-motor) to produce mechanical motion to drive an electric generator rather than allowing the wave-induced fluid flow to directly turn a water-turbine generator. This incurs additional energy conversion losses before electric power is generated to the grid. Air turbines positioned above the water surface must consider corrosive effects due to mechanical parts being exposed to a salt-laden air/water boundary and are also noisy. Air, as a compressible intermediary mechanism, being less dense than water, also results in more complex mechanical designs needed to harvest the wave energy. For the same flow rate as water, air as an active medium requires more surface area to generate the same amount of power as water.

Prior wave overtopping devices generate hydroelectric power by creating a higher surface elevation (head) relative to the still water level. These devices have the disadvantage of not only being in direct contact with the surface waves, but also require a large basin to hold the water. In addition, the head must be maintained or the turbine can run dry. Near-shore surface wave energy converters also have the undesirable consequence of being unsightly when viewed from the shoreline, especially in locations where coastal real-estate is at a premium.

The following are examples of other wave conversion devices for generating electrical energy. In U.S. Pat. No. 4,371,788, and U.S. Pat. No. 4,170,728, the disclosed systems extract wave energy by enabling water particles to move a sail beneath the water. U.S. Pat. No. 4,279,124 disclosed the use of propellers mounted on a submerged support, which are turned by waves to extract energy. A device called the "Bristol Cylinder" developed by Dr. D. Evans employed a large submerged cylindrical concrete mass floating beneath the surface, which can be made to move in a circular fashion when following the wave induced water-particle orbital motion, and hydraulic rams are used to pump high pressure oil to turn an electric generator. For a detailed description, see Hagerman, G., "Wave Energy Resource and Economic Assessment for the State of Hawaii." prepared by SEASUN Power Systems for the Department of Business, Economic Development and Tourism, Final Report (1992). These prior devices have the disadvantages of using intermediary mechanisms for the incoming wave energy, resulting in more complex mechanical designs needed for wave energy conversion.

A wave energy conversion system, described in "About the Development of Wave Energy Breakwaters", by Graw, K., published in Lacer No. 1, Leipzig Annual Civil Engineering Report, Universitat Leipzig (1996), employed wave-activated pulsating flow beneath a divider plate, to capture wave energy by driving a low-head hydro-turbine also beneath the divider plate. However, this type of device utilized only wave-induced flow below the divider plate and did not make use of the significant wave-induced flow above and through a surface. The orientation of its hydro-turbine for power generation was also more dependent on the incident wave direction.

Another type of device called the "WaveMaster" wave energy converter, developed by Ocean WaveMaster Ltd., of Manchester, U.K., employed a submerged surface to capture wave energy through multiple one-way valves creating zones of high and low pressure water that flows through turbines within the structure. However, the WaveMaster converted wave energy only across the structure and not through or beneath the surface. The one-way valves used result in power being generated on only one-half of the wave cycle. Debris that may accumulate due to flow through the downward check-valves can also be an operation or maintenance concern.

An example of a device for converting water waves into usable energy by a providing a water turbine-generator centrally located in an aperture of a submerged horizontal surface to generate electric power is described in U.S. patent application Ser. No. 12/348,518 filed on Jan. 5, 2009, of which the inventor herein was a co-inventor, and is incorporated by reference herein.

SUMMARY OF INVENTION

The present U.S. patent application is directed to a bidirectional axial flow turbine with self-pivoting blades, for use in a central opening of a submerged surface of a wave energy converter. The wave energy converter employs a submerged horizontally-aligned structure provided with a central opening formed in a horizontally extending surface thereof for inducing water-particle motion in a flow into and from the central opening formed in the horizontally extending surface of said submerged structure.

Waves passing over the submerged surface of the converter induce a bidirectional fluid flow within the central opening of said surface. The turbine with self-pivoting blades is placed within this opening and is driven by this bidirectional fluid flow. The self-pivoting blades of the turbine automatically change the orientation of the blade angles according to changes in fluid flow direction, resulting in the turbine shaft rotating in only one predetermined direction.

Adjustment of the blade angle also results in optimum efficiency in either flow direction. The axis of rotation of the turbine assembly lies vertically and, when in still water, the turbine blades are balanced such that they are positioned in a horizontal plane, orthogonal to the axis of rotation.

Due to fluid flow interaction, forces are exerted on the blades creating a moment, automatically rotating them in the correct direction. A mechanism is used to convert this rotation into a shaft motion that is arrested when end stops at predetermined positions are reached. The blades are then positioned at the correct angle of attack for the incoming flow direction. Symmetrical blades allow it to respond to flow in either direction. As the turbine speed increases, the incident and exit angles of fluid flow to the blades approach similar values. The blade profile becomes flatter in shape. The minimum number of blades is three for balanced rotor conditions. For improved efficiency, the self-pivoting blades can further be constructed to twist along the length of the blade in either of two respective twist configurations corresponding with changes in flow direction Other objects, features, and advantages of the present invention will be explained in the following detailed description of the invention having reference to the appended drawings.

DETAILED DESCRIPTION OF INVENTION

Figure 1:
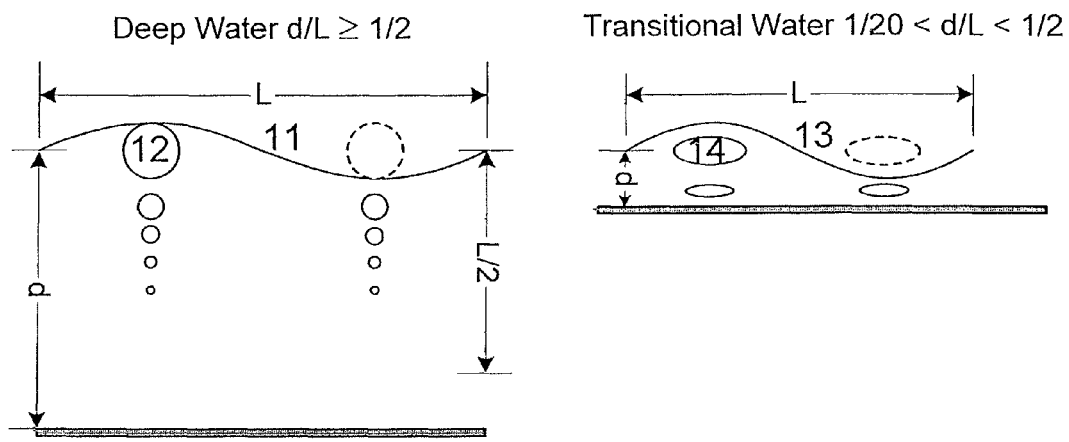
FIG. 1 shows water-particle motion in deep water compared to more shallow (transitional) water.

In FIG. 1, the general nature of wave-induced water-particle motion is illustrated in deep water compared to more shallow (transitional) water. For a wave 11 in deep water, where the water depth d to wavelength L ratio is greater than about 0.5, the water particles oscillate in a circular manner as designated by circles 12. These trajectories decay exponentially with depth and at a depth of ½ the wavelength, the radii of the water-particle orbits are negligible. In shallower depths of transitional water, a wave 13 "feels" the sea floor bottom and the circular orbits become elliptical in nature as designated by ellipses 14.

Figure 2:
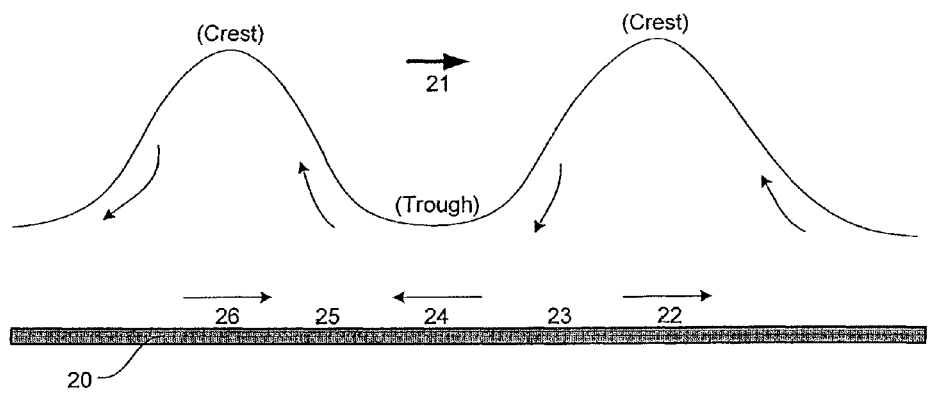
FIG. 2 shows wave-induced water-particle motion over a submerged surface.

In FIG. 2, the wave-induced water-particle motion is exploited using a submerged surface. As a deep-water gravity wave moves over the shallower depth of the submerged surface 20, in the direction from left to right 21, the wave "feels" this surface resulting in an increase in wave height and a reduced wavelength. The deep-water circular orbits of water particles become elliptical in nature, and the shallower the water depth is, the more they become elongated in the horizontal direction. This results in a higher horizontal fluid velocity beneath the wave and across the submerged surface 20. As the wave moves from left to right 21, when observed from a stationary position, the wave motion at the crest of the wave induces horizontal water-particle motion in the direction of the wave, as indicated at numeral 22. As the wave moves from the leading crest to a trough, the water-particle motion is downward, being predominantly in a vertical direction midway between the crest and the trough, as indicated at numeral 23. At the trough, the water-particle motion is horizontal in the direction opposite to the wave, as indicated at numeral 24. As the wave moves from a trough to a following crest, the water-particle motion has an upward movement and is predominantly in a vertical direction midway between the trough and crest, as indicated at numeral 25. At the following wave crest, the water-particle motion is again in the direction of the wave, as indicated at numeral 26.

Figure 3:
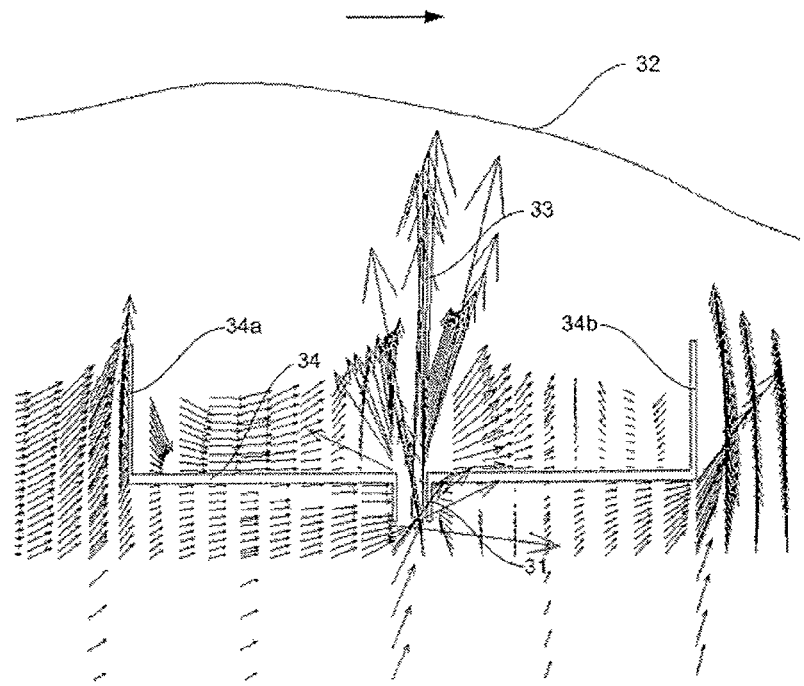
FIG. 3 shows a preferred embodiment of a wave energy conversion device in which wave-induced water-particle velocity vectors are forced upward through a central opening of a submerged structure when a wave is moving from trough to crest.

In FIG. 3, a preferred embodiment of a wave energy conversion device in accordance with the invention is shown directing a wave-induced flow 33 upward through a central opening 31 in a bottom surface of a submerged structure 34 when a wave 32 is moving from trough to crest. At various selected points in the domain, the resultant magnitude and direction of horizontal and vertical velocities are indicated by the arrows in black. The results were obtained by use of linear potential theory and the boundary-element method. The wave-induced fluid flow is channeled through the central opening 31. As the wave 32 moves over the submerged structure 34, the horizontal and vertical components of the fluid flow beneath the surface wave vary depending on the phasing of the wave. The fluid flow is forcefully drawn up through the central opening 31 from beneath the surface of the structure when the surface wave moves from trough to crest over this region. The wave elevation is near the still water level when maximum flow occurs. Side walls 34a, 34b are provided on opposite sides of the bottom surface of the structure 34 to concentrate the flow. This extends the path of the fluid, flowing through the opening rather than passing over the ends of the surface.

Figure 4:
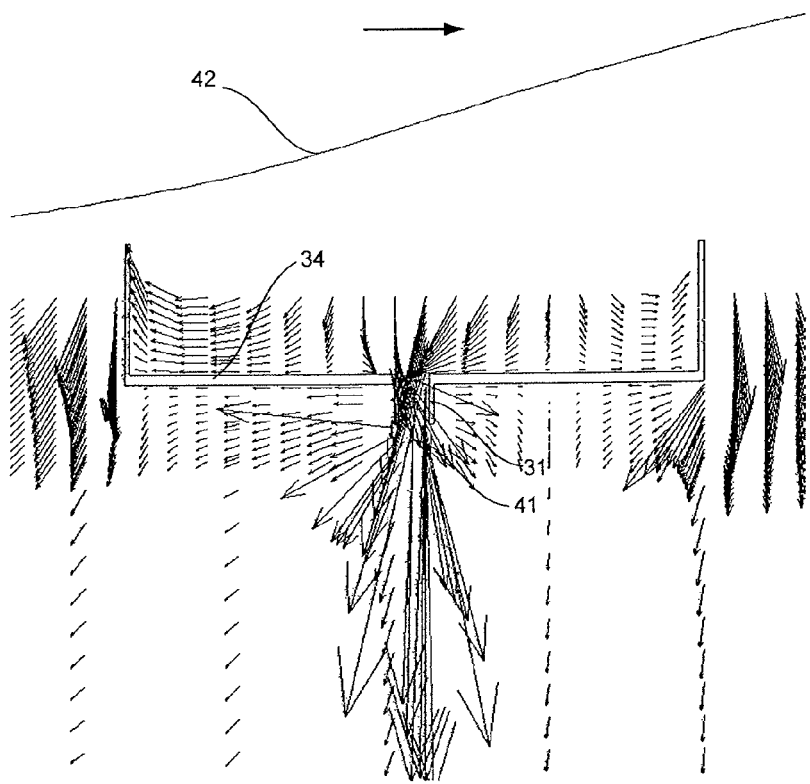
FIG. 4 shows the wave-induced water-particle velocity vectors are forced downward through the central opening of the structure when the wave is moving from crest to trough.

FIG. 4 conversely shows the maximum wave-induced flow 41 being channeled downward through the central opening 31 of the structure 34 when the wave 42 is moving from crest to trough.

A preferred embodiment of a bidirectional axial flow turbine with self-pivoting blades will now be described for use in a central opening of a submerged surface of a wave energy converter designed to be driven by the bidirectional wave-induced fluid flow in this opening, as a wave on the water's surface passes over the submerged surface. In particular, the bidirectional axial flow turbine with self-pivoting blades is designed to be self-starting and has blades that turn in synchrony with the oscillating flow within the opening of a submerged surface so as to capture the energy of the wave-induced flow.

For many wave energy conversion devices (WECs) that convert air or water movement into electrical energy, the active medium turns the shaft of a turbine, which is connected to an electric generator. For fixed blade turbines, the efficiency peaks at specific flow conditions. By allowing the blades to rotate to be at the optimum shock-free angle for the incoming flow, the turbine has a much broader efficiency range for a varying fluid flow environment by being at the optimum shock-free angle for the incoming flow. The blades are also less likely to stall and have better torque, thus providing better startup conditions.

This broader efficiency range has been noted with the Kaplan hydro-turbine U.S. Pat. No. 1,467,672, where the guide vanes regulate the amount of unidirectional water flowing through the turbine thus controlling the power output of the turbine, while the maximum efficiency at any one flow rate is determined by rotating the blades hydraulically to a certain blade angle. Leakage of hydraulic oil from seals in the turbine can be a concern. This can also be noted with earlier fixed blade Wells turbines when driven by bidirectional air flow from an oscillating water column of a WEC; self-starting problems and stalling at high air flow rates have been experienced with these blades. Wells air turbines are being improved with passive rotor blade displacement U.S. Patent Application No. 2011/0103958. The Dennis-Auld turbine shown in U.S. Pat. No. 6,360,534, and also as described in U.S. Published Patent Application No. 2010/0290908 can respond to the bidirectional air flow from an oscillating water column of a WEC, by rotating the blades accordingly with a torque motor that utilizes a control signal from a pressure sensor placed in the ocean beneath the incident waves to the WEC. This has resulted in a turbine that has a broader efficiency range. The rotation of the self-pivoting blades as described in this invention are part of a water turbine and changes to the symmetrical blade angle occur automatically by the bi-directional fluid without utilizing a motor. When in still water, the blades are balanced such that they are in a horizontal plane orthogonal to the vertical turbine axis of rotation. The blade angles can be continuously varied by end stops, resulting in turbine rotation in only one direction.

Other applications that used self-activating blades are for boat propulsion U.S. Pat. No. 5,032,057 as well as boat power generation U.S. Pat. No. 5,554,003 by positioning the blade through motor driven torque and hydrodynamic loading on the blade. The blades are not self-pivoting by fluid flow. Blades with automatic pitching for a wind turbine U.S. Pat. No. 5,193,978 and automatic folding wings for a water turbine application U.S. Pat. No. 4,424,451 have the fluid flow moving radial to the rotor rotation. Part of the time the rotor assembly has the blades rotating against the fluid flow, thereby decreasing the efficiency of the turbine. The self-pivoting blades as described in this invention have the fluid flow moving in the direction of the turbine rotating axis and the rotation of the blades is not counter to the fluid flow.

For research relating to self-pitching blades for an air turbine of an oscillating water column see Kim, T. H. et al. "The Optimization of Blade Pitch Settings of an Air Turbine Using Self-Pitch-Controlled Blades For Wave Power Conversion", J Solar Energy 2001; 123:382-6. The self-pitching blades as described have their pitch axis near the leading edge of the blade and oscillate between two preset angles. The self-pivoting symmetrical blades for this invention encounter swirling water within a water turbine. In still water, the blades are balanced such that they are positioned in a horizontal plane, orthogonal to the vertical turbine axis of rotation. The blades can be set at various self-pivoting positions.

Longer turbine blades have a significant amount of blade twist to improve the efficiency of the blades by providing a more shock-free fluid flow over the length of the blade. In U.S. Pat. No. 7,931,443, the axial flow turbine blades are designed to untwist at high rotational speed. For this invention, the blades, in addition to having the entire blade pivot or rotate, have multiple segments that have a constrained pivot motion over the length of the blade so that the compliant surface morphs or twists for one direction of flow and then twists in the other direction for the reverse flow.

To overcome the problems and deficiencies of the prior bidirectional axial flow turbine designs, an improved bidirectional axial flow turbine with self-pivoting blades is provided that automatically compensates for changes in flow direction resulting in the turbine shaft rotating in only one direction. The blade angle can be adjusted for optimum efficiency in either flow direction. It is self-starting and the blades are in synchrony with a changing flow environment and designed so that the fluid drives the blades over their entire surface area. The turbine assembly is mounted vertically, and the turbine blades when in still water are balanced and lie in a horizontal plane such that they are orthogonal to the axis of rotation when no flow is occurring through the turbine. The blades can be set at various self-pivoting positions.

As each wave passes over the submerged surface of the wave energy converter (WEC), it induces an oscillating flow in the opening central to the surface, resulting in the fluid in the turbine region changing both in magnitude and direction (assuming that no check valves are used to rectify the flow). The WEC experiences changes in water height and flow magnitude, requiring higher flow rates to operate efficiently. By constructing the symmetrically-shaped blades to be self-pivoting and not overlapping, the turbine responds to bidirectional flow. The turbine blades are uniformly spaced around the circumference of the turbine hub within a tubular housing. The bidirectional fluid flow, when leaving either inner guide vanes, has a swirling motion as it travels along the tubular housing, rotating in one direction. The axis of rotation of the self-pivoting symmetrical blades is such that this bidirectional swirling fluid interacts with each blade. The resultant forces on the blades due to the fluid flow exert a moment on the blades, automatically rotating them in the correct direction until predetermined end stops are reached. The blades are then positioned at the correct angle of attack for the incoming flow direction. The end stops can be placed near or at some distance away from the blades and can be made variable at the chosen position to allow for rotating the blades at various angles. As long as the fluid flow is of sufficient magnitude to generate torque to the turbine, the blades remain in contact with the end stops. Making the blades symmetrical will allow them to respond to flow in either direction. With fewer blades, the speed of the turbine increases and the incident and exit blade angles approach similar values. The minimum number of blades is three for balanced rotor conditions. To have a shock-free entry of flow to the self-pivoting blades, the blades can be constructed to twist along their length in either of two twist configurations corresponding to changes in the bidirectional flow. Thus, the efficiency of the turbine is improved.

Figure 5:
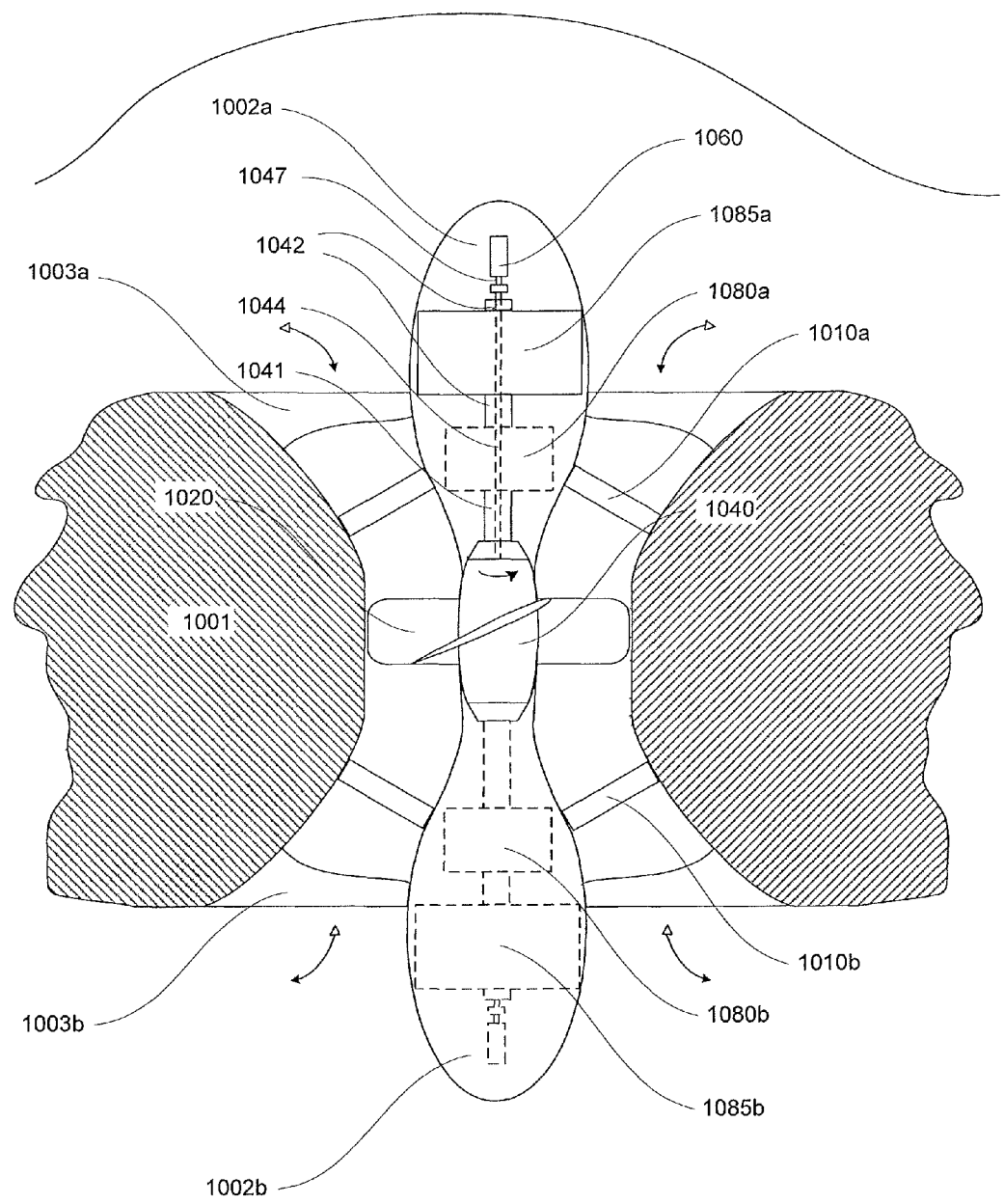
FIG. 5 illustrates a preferred embodiment of a bidirectional axial flow turbine with self-pivoting blades for use in the central opening of the submerged surface of the wave energy converter.

Referring to FIG. 5, an overview of a preferred embodiment of a bidirectional axial flow turbine with self-pivoting blades is shown having turbine assemblies 1002a and 1002b on opposite ends of a vertical axis of a turbine hub 1040, which is positioned axially within the central opening of the submerged surface 1001 of the wave energy converter (WEC). A bidirectional fluid flow passes through one set of inner guide vanes 1010a or 1010b, generating a free vortex flow in the axial direction to rotate the turbine blades 1020, before exiting through the opposite set of inner guide vanes 1010b or 1010a. On passing through the entry inner guide vanes, the resulting spinning vortex of water always rotates in the same direction over the turbine blades. As the flow is bidirectional, the entry inner guide vanes become the exit inner guide vanes in the opposite flow direction and thus the exit inner guide vanes are configured in the opposite direction to the flow rotation. This reduces the exit kinetic energy flow, thereby reducing turbine losses. The entry fluid velocity is increased by a decrease in entry diameter, while the exit fluid velocity slows down due to an increase in channel diameter, again reducing turbine losses. Stopping the turbine can be done by either closing the inner guide vanes or raising/lowering the WEC surface, so that no significant flow is occurring in the opening of the surface.

Stays 1003a and 1003b support the turbine assemblies 1002a and 1002b and, if made hollow, can provide air or water cooling to the generator 1085*a* or 1085*b*. A mechanism within the hub section 1040 converts the rotary action of the self-pivoting blades into end-stop travel motion of an end-stop inner shaft 1044. The end-stop inner shaft engages an end-stop mechanism (3 variants described herein) which defines the desired end-stop positions for the pivoting of the blades. An important variant is shown in FIG. 5 in which the pivoting of the blades is converted into linear up and down motion of the end-stop inner shaft which is coupled to an end-stop mechanism 1060 located outside the turbine hub 1040 by an inner shaft extension 1044. This up-and-down motion is arrested by end-stop positions defined by the stop limit mechanism 1060 which sets the angles of the blades. The end-stop positions can be continuously varied to adjust the blade angle to an optimal angle for the speed and density of the water flow. The shaft 1044 is extended up through shafts 1041 and 1042 that connect the optional gear box 1080*a* and generator 1085*a*, resulting in linear travel of the shaft 1047 within the end stop mechanism 1060. The adjustment of the end stops can be manually set or driven by electric or hydraulic motors. The electrical connections to the end stop mechanism 1060 are away from the rotating shaft of the turbine/generator, thus simplifying the design. Collector rings are therefore not necessary to connect to rotating electrical devices and as the self-pivoting blades are not hydraulically driven, leakage of hydraulic oil into the water is avoided. Alternatively, the end stops may also be located near the blades in the hub 1040 and may have only two fixed stop limit positions. The guide vane mechanism can be located within the turbine assembly 1002*a*.

In the opposite turbine assembly 1002*b*, the generator 1085*b* and gear box 1080*b* are shown dotted, as they are optional. If they are not used, the housing of the turbine assembly 1002*b* is used to channel the fluid flow, and contains the control mechanism for the inner guide vanes and provides added buoyancy to the entire neutrally-buoyant surface. It can then also contain the end stop assembly 1060 directly connected to the hub 1040, reducing the length of the actuating shaft that would otherwise go up through the shafts 1041 and 1042 connecting the turbine and generator. Adding the generator 1085*b* to assembly 1002*b* provides redundancy, increases the power output and can also be used to reduce the size of each generator. It also adds inertia to the system, helping to keep the shaft RPM from dropping during the time the turbine flow direction reverses.

Figure 6:
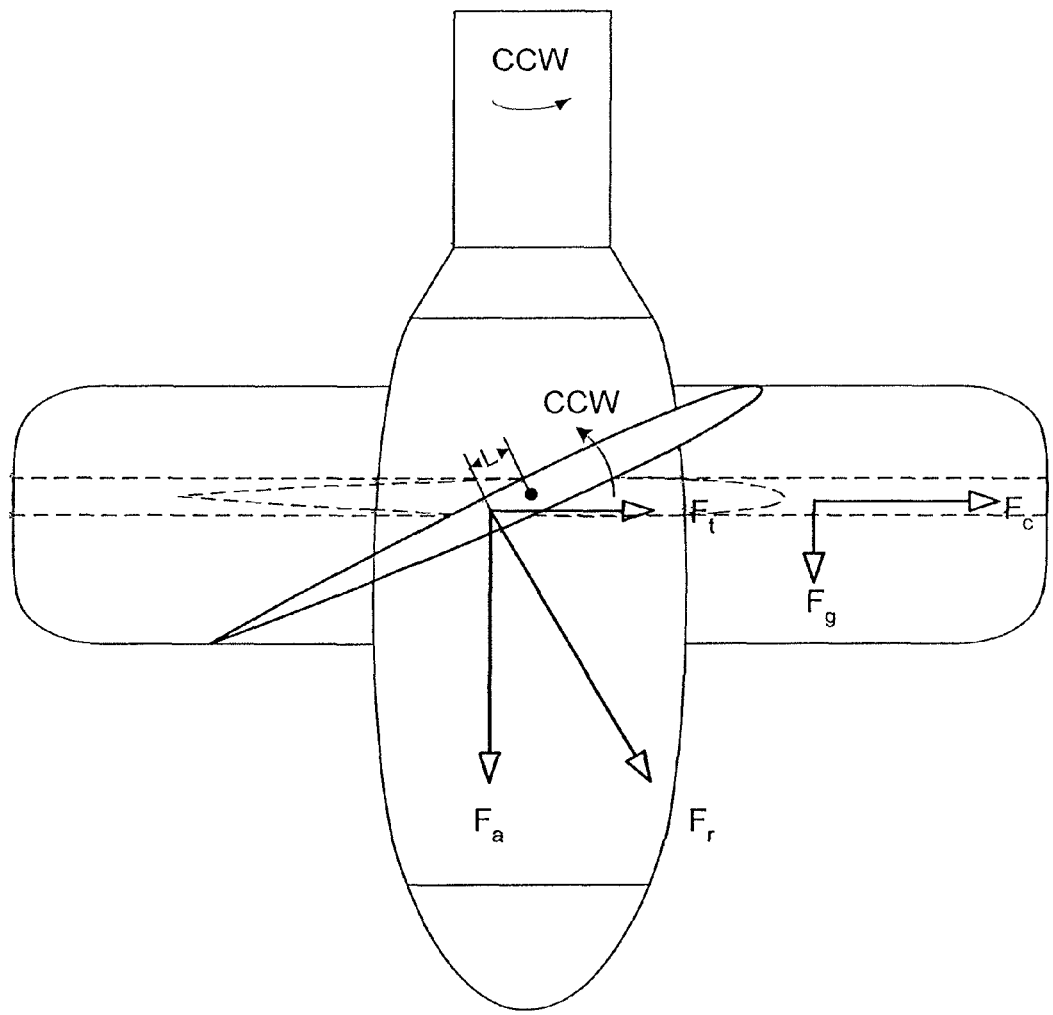
FIG. 6 is a schematic diagram showing the forces on the blades of the bidirectional axial flow turbine with self-pivoting blades.
Figure 7:
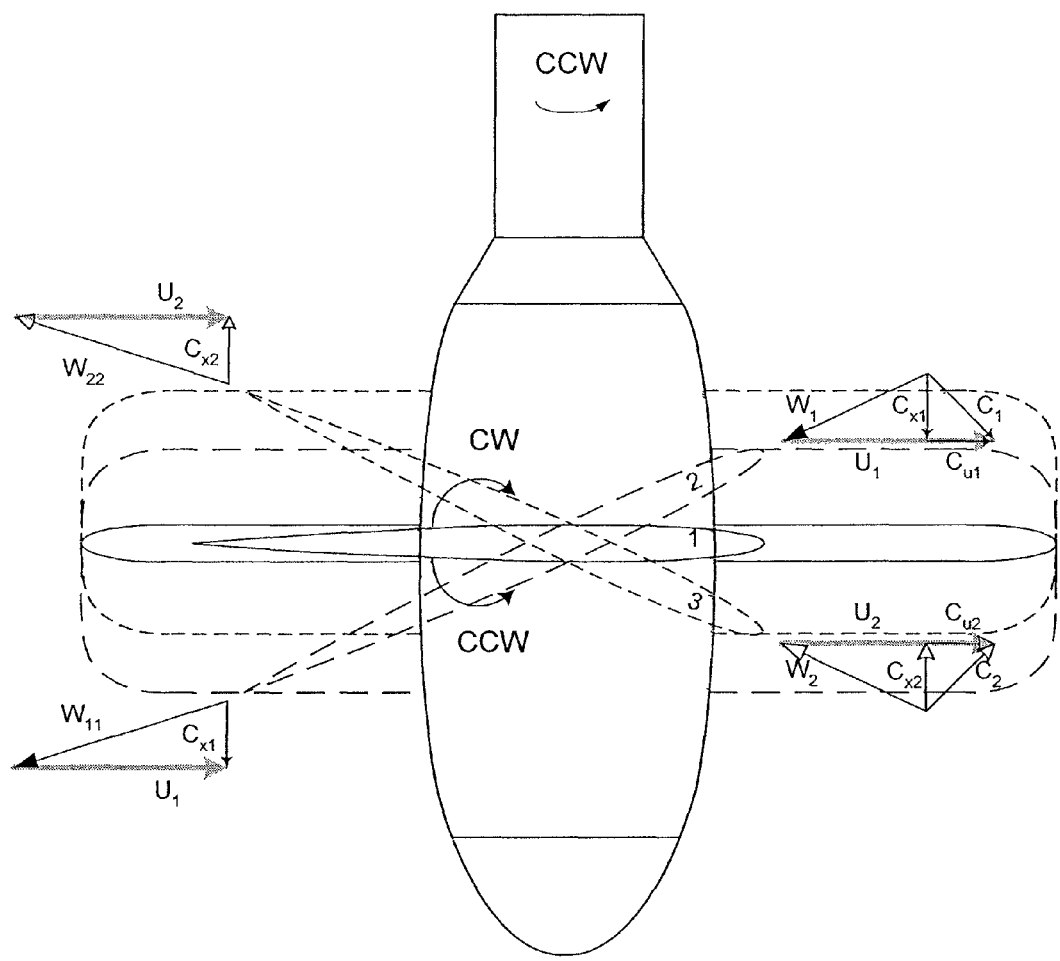
FIG. 7 is a schematic diagram showing the position of the blades for no flow or transitioning flow, upward flow and downward flow.

Referring to FIG. 6, the forces on the blades of the bidirectional axial flow turbine with self-pivoting blades are illustrated schematically. With still water conditions, i.e. no flow over the blade, the dominant force on the blade is gravity Fg and the submerged symmetrical blade (as shown in dotted line in FIG. 14.) is balanced such that it lies in a horizontal plane, with the head of the blade pointing in the direction of rotation. The axis of rotation is chosen at a point, such that with the fluid moving downward on the blade, the center of pressure on the blade creates a moment, which causes the blade to move in the counter-clockwise (CCW) direction until the chosen end stop position is reached. The forces present on the blade are the resultant lift force Fr, the centrifugal force Fc and the weight of the blade Fg. The lift force Fr is made up of a (vertical) axial force Fa and a (horizontal) radial force Ft. The radial force Ft exerts a torque on the shaft causing the turbine/generator shaft to turn in the CCW direction (as viewed from the upper end of the turbine shaft). The resultant force Fr has a moment arm of length L from the blade axis of rotation to the center of pressure, resulting in a moment that rotates the blade to its end stop. Fluid moving in the upward direction will cause a moment to rotate the blade in the opposite or clock-wise (CW) direction until reaching the other end stop position. While the axial force reverses direction with change of flow direction, the radial force is in the same direction causing the turbine/generator to rotate in the same CCW direction with change in flow direction. It could also be designed to have the turbine/generator to only rotate in the CW direction. With increased blade speed and increased discharge rate due to opening of the blade, the center of pressure moves to the trailing edge of the blade, increasing the moment on the blade.

Figure 9:
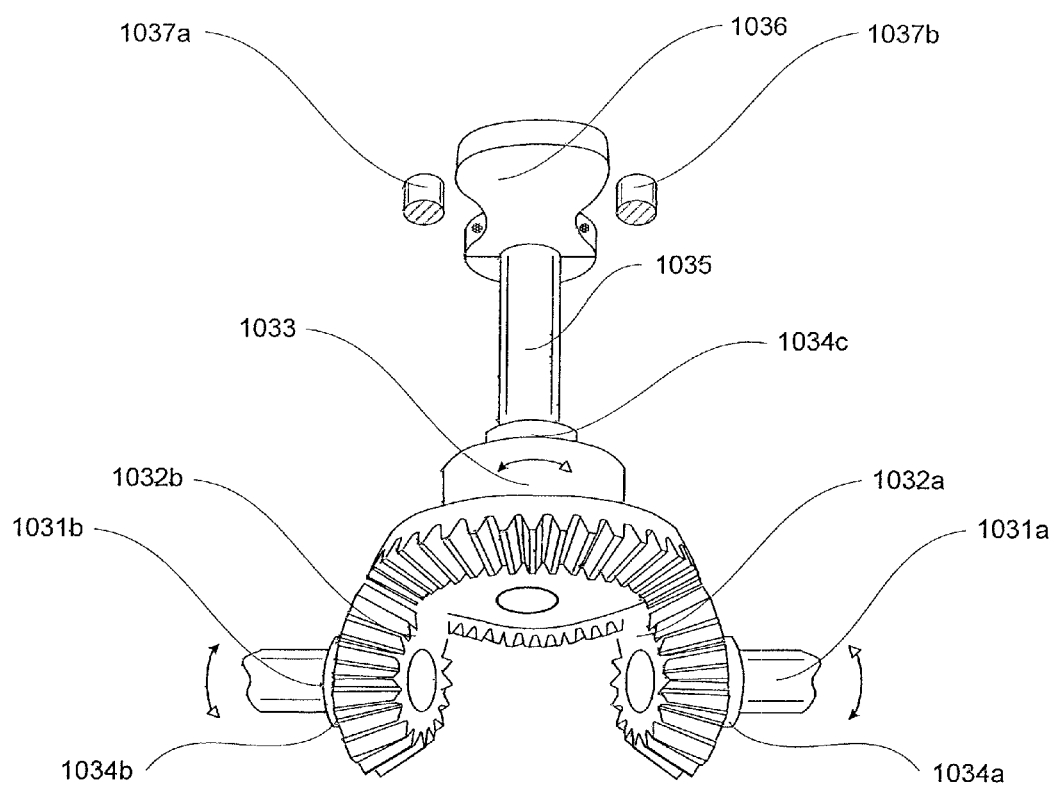
FIG. 9 shows a gear mechanism to convert the self-pivoting blade rotation into a rotating motion between two stop limits.

Due to the moment on the blade created by the flow, the trailing edge of the blade always moves in the direction of fluid flow. FIG. 9 shows the blade in three positions: (1) the blade position for no flow or when transitioning between flow directions, located at this position due to gravity and centrifugal forces on the blade; (2) the blade in the downward flow direction rotating CCW from mid-position; and (3) the blade in the upward flow direction rotating CW from mid-position. The inner guide vanes induce a vortex swirl into the fluid flow. Velocity vectors C1 and C2 are the resultant fluid flow in both the downward and upward directions respectively. These vectors have a downward axial component Cx1 and an upward axial component Cx2 as well as tangential components Cu1 and Cu2 respectively. The axial velocity Cx1 and Cx2 is determined by flow rate divided by area of the turbine annulus. Based on free vortex theory, the tangential velocity component times its radius is a constant to conserve angular momentum.

The incident velocity vectors W1 and W2 at the leading edge of the blades are shown for positions (2) and (3) respectively. The velocity vector W1 results from the downward flow vector Cx1 and the difference between the blade velocity U1 and the horizontal component due to swirl Cu1. Likewise the velocity vector W2 results from the upward flow vector Cx2 and the difference between the blade velocity U2 and the tangential component of swirl Cu2. For an ideal blade, to maximize the energy transfer to the blade, zero tangential velocity occurs when the fluid leaves the blade, i.e. the whirling entry water on the blade's leading edge has no spin left when leaving the trailing edge of the blade. Therefore, for flow in the downward direction, the blade's trailing edge velocity vector W11 is composed again of Cx1 and now only U1. Likewise, the velocity vector W22 for the upward flow is composed of Cx2 and now only U2. Generally, turbines with fewer blades have a faster rotational speed, with three or more blades used to provide balanced rotation of the blade assembly. As the operating speed of the turbine increases, the angular difference between vectors W1 and W11 and W2 and W22 becomes less and the blade approaches a flat plate profile, i.e. having a closer configuration to that of the self-pivoting symmetrical blades. The blade velocity vectors U1 and U2 vary over the length of the blade, increasing in speed from the hub to the tip of the blade. To compensate for this difference in speed over the blade length, so that a shock free entry of fluid occurs to the blade, the blade is generally twisted. For a non-twisted blade a compromise is made in blade length, width, profile and number of blades, affecting the blade speed and flow rate through the turbine enclosure.

Figure 8A:
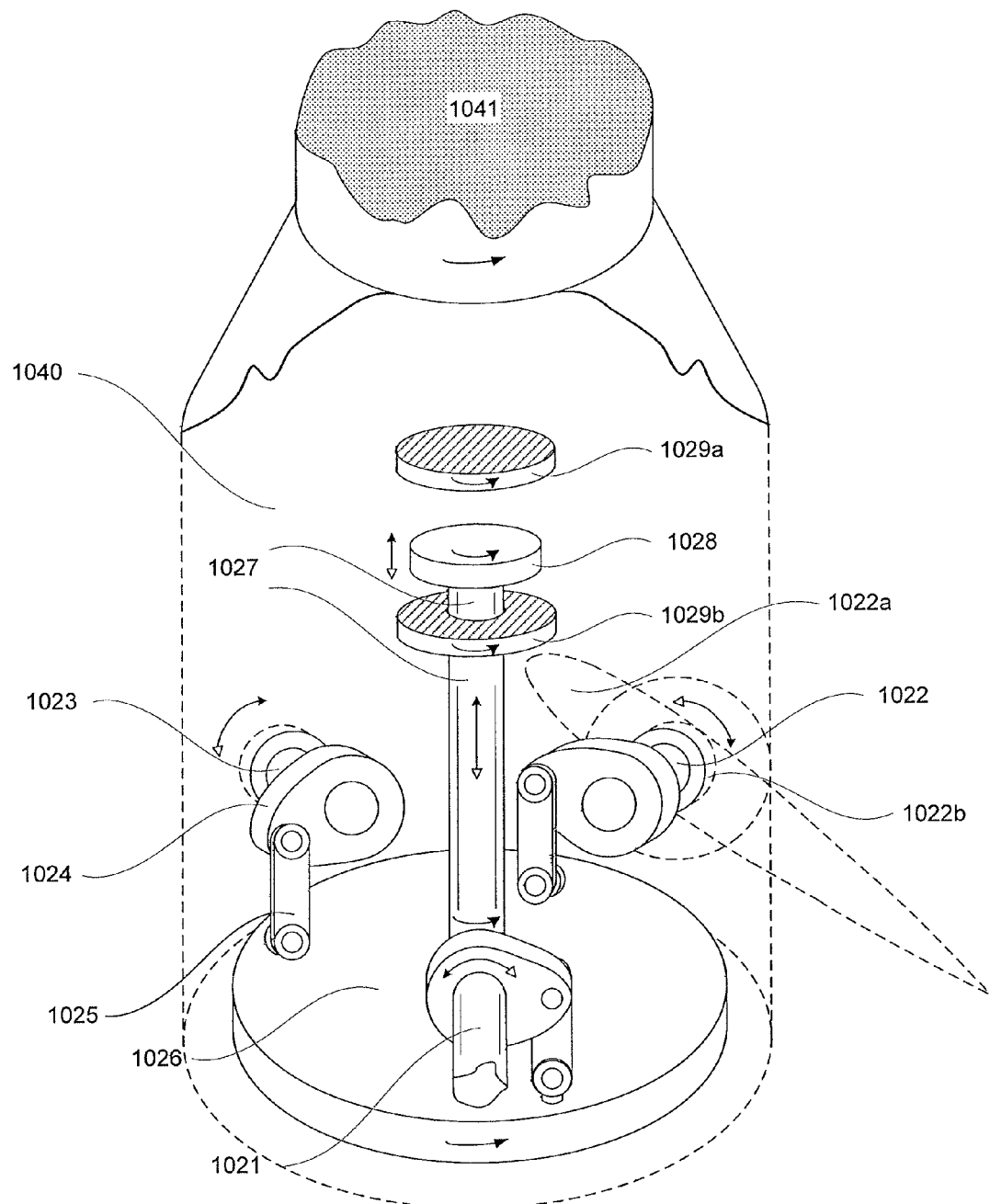
FIG. 8a shows a lever mechanism to convert the self-pivoting blade rotation into an up-and-down shaft motion between two stop limits.

Another variation provides the end-stop mechanism within the hub section 1040 as shown in FIG. 8*a*. In this variant, the three blades are pivoted on respective blade shafts 1021, 1022 and 1023 (more blades can be utilized). Downward flow on the blades causes these three shafts to rotate CCW when observed from the blade end (dark arrow head). Each blade shaft causes its respective cam 1024 to move CCW. The link 1025 attached to the cam 1024 raises the base support 1026 and causes the shaft 1027 to move upward until the stop 1028 at the end of shaft 1027 encounters the fixed stop 1029*a* (hatched showing fixed to hub 1040). Similarly, for upward flow, the blade shaft rotation will be CW (light arrow head) and the shaft 1027 will move downward until the stop 1028 at the end of shaft 1027 encounters the fixed stop 1029*b* (hatched showing fixed to hub 1040). Due to the self-pivoting action of the blades, the overall assembly only rotates in one direction (shown as CCW direction as viewed from the top of the base 1026), while the shaft 1027, as well as rotating with the base, moves up and down depending on the flow direction.

Figure 8B:
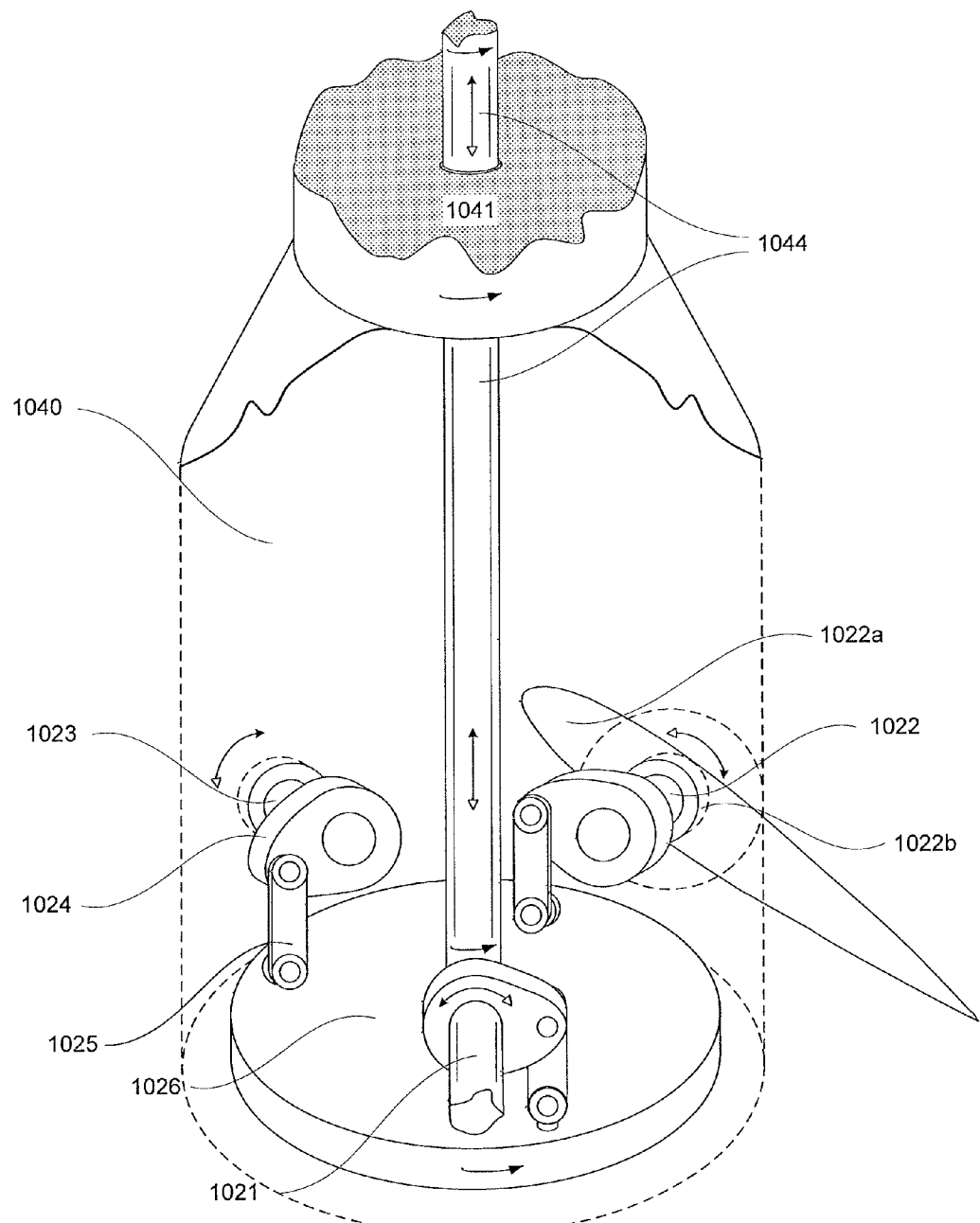
FIG. 8b shows a lever mechanism to convert the self-pivoting blade rotation into an up-and-down shaft motion that allows variable control between stop limits placed outside of the hub.

FIG. 8*b* illustrates the coupling converting the blade pivoting motion to up and down linear motion for the previously mentioned variant in which the end-stop mechanism is located external to the turbine hub (see FIG. 5). The end-stop limits are defined outside of the hub 1040 within the stop limit mechanism 1060 as shown in FIG. 5, and the inner shaft 1027 is replaced with a inner shaft extension 1044.

FIG. 9 shows a beveled gear mechanism, which is another variant for the end-stop mechanism located within the hub section 1040. The two angles of the self-pivoting blades are set using beveled gears instead of a lever mechanism for each change in flow direction. Blade shafts 1031*a* and 1031*b* are shown (shaft 1031*c* is not shown to allow the gearing to be visible). The end of each shaft is connected to a beveled gear 1032*a* and 1032*b*. These beveled gears are each connected to one main beveled gear 1033. The beveled gears are supported by bearings 1034*a*, 1034*b* and 1034*c*. Downward flow on the blades causes the blade shafts 1031*a* and 103*b* to move CCW (dark arrow head) as viewed from the non-geared end of the blade shaft, resulting in the main gear 1033 moving CCW as viewed from the gear end of shaft 1035. This causes shaft 1035 to move CCW until cam 1036 comes in contact with the fixed end stop 1037*a* (hatched showing fixed to hub). Similarly, upward flow on the blades will result in a CW motion of shaft 1035 causing the cam 1036 to come in contact with the fixed end stop 1037*b* (hatched showing fixed to hub). Thus, as the self-pivoting blades rotate due to changes in flow direction, the shaft 1035 rotates respectively until reaching cam end stop limits setting the self-pivoting blade angle. As the entire assembly is mounted within the hub 1040 as shown in FIG. 5, it rotates in the CCW direction as viewed from the top of cam 1036 by the torque generated by the fluid flow interacting with the self-pivoting blades.

Figure 10:
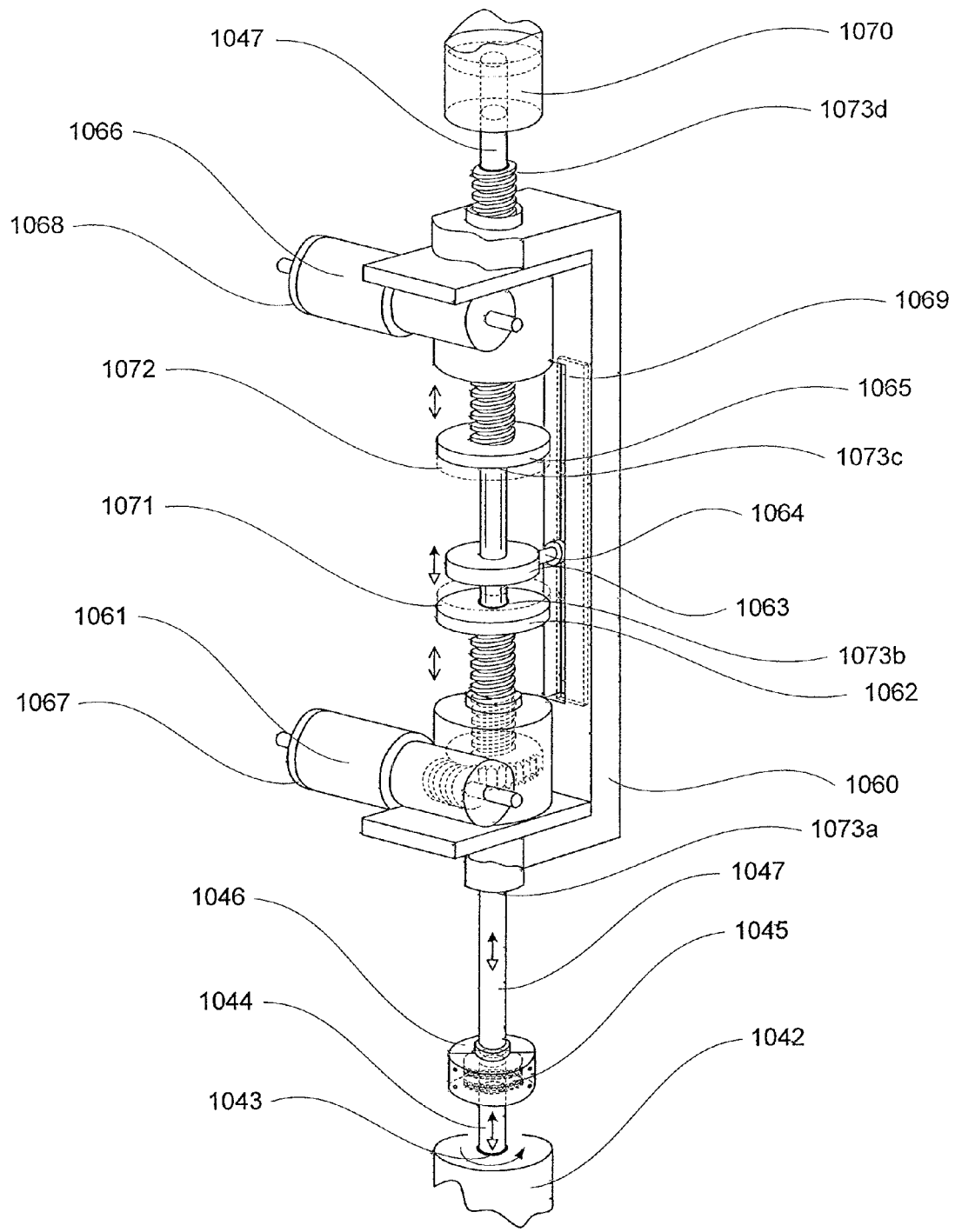
FIG. 10 shows an end stop mechanism outside of the hub for the bidirectional axial flow turbine with self-pivoting blades.

FIG. 10 shows how the linear motion of shaft 1044 (also shown in FIG. 5 and FIG. 8*b*), activated by rotation of the self-pivoting blades, is transferred to the end stop assembly 1060 mounted away from the hub 1040, FIG. 5. The shaft 1044, that comes up through the generator shaft 1042, has both an up/down motion as well as a rotating motion. Its motion is separate from that of the generator shaft 1042 with linear bearing 1043. To obtain only linear up/down motion, two thrust bearings 1045 within the housing 1046 are used. The bidirectional thrust bearings allow the shaft 1044 to rotate as well as apply upward and downward thrust to the housing 1046. The housing 1046 and the shaft 1047 are fixed to one another and are designed to only move in the up and down direction.

The shaft 1047 passes up through the motor-driven end stop mechanism 1061, end stop plate 1062 and is connected to the stop slider 1063, continues on through stop plate 1065, through the motor-driven end stop mechanism 1066, and ends at viscous damper 1070. The stop slider 1063 is prevented from rotating by roller arm 1064. Thus the stop slider 1063 moves freely between end stops 1062 and 1065. The motors 1061 and 1066 drive the worm gears that turn screws either up or down to set the desired end stop positions. The screws are keyed to prevent rotation of the attached end stops. By using this configuration, a high amount of torque is available to the end stops so that the blade shaft can be moved, should a correction be required from its initial position. The configuration also provides a high degree of positioning accuracy. Each of the motors has absolute position sensors 1067 and 1068, which can send signals to a control to monitor the position of the end stops. End-of-travel limit-switches can also be installed, if desired. A further absolute position sensor 1069 monitors the position of the stop-slider 1063. To slow the rate at which the stop-slider comes in contact with the end stops, a dashpot viscous damper 1070 is located at the end of the shaft 1047. Also shown is an alternate approach, where a damper 1071 and 1072 is placed before each end-stop 1062 and 1065 respectively, so that the stop-slider 1063 is free to move quickly between end stops, while slowly approaching its final end stop position. Thus, the blades can arrive at their correct operating position sooner over the next cycle of the wave, increasing its efficiency. The damper or dampers can be viscous, a spring or other dampening mechanisms. Linear bearings 1073*a*, 1073*b*, 1073*c* and 1073*d* can be inserted at the positions shown, to allow the shaft to freely move within the end stop assembly 1060.

Figure 11A:
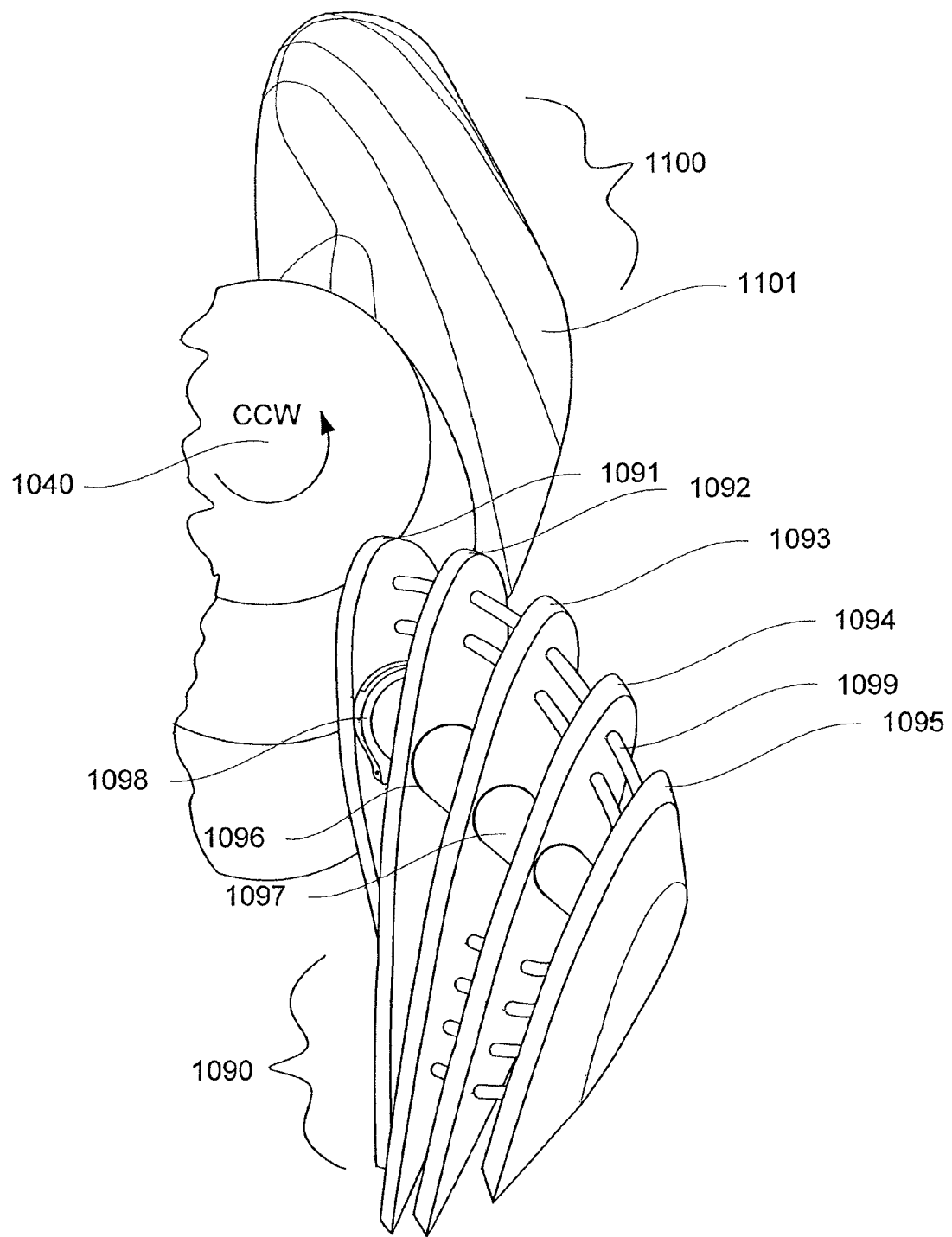
FIG. 11a shows self-pivoting, morphing blades that can twist to a predetermined angle depending on the flow direction.

Kaplan turbine blades are normally twisted, to provide a shock-free entry of flow into the leading edge of the blade. Each blade is twisted for a fixed specific set of angles than changes from the hub to the tip of the blade. Thus as the blade rotates, the amount of twist in the blade remains the same. Generally, the blade is thicker at the hub than at the tip to provide strength to support the blade. For a self-pivoting blade to have a shock-free entry in a bidirectional flow regime, the blade would have to be twisted for one direction of flow and then twisted in the opposite direction for flow in the reverse direction. FIG. 11*a* shows such a self-pivoting blade that morphs into two different twisted blade shapes depending on the flow direction. Shown in FIG. 11*a* are two self-pivoting morphing blades 1090 and 1100 of a three blade turbine, which are connected to the hub 1040. The blades are shown at the angle for the downward flow direction and the turbine rotation is CCW. An inside view of the blade 1090 displays the multiple inner supporting sections (1091-1095), while 1100 shows the final blade configuration after a compliant skin 1101 is applied over these sections.

Preferably, the blade's thickness decreases in size from the hub to the tip of the blade. Most of the sections within the blade have inner bearings 1096 that allow them to rotate a certain number of degrees around a conical shaft 1097 that extends from the hub to the tip of the blade. The blade tip section 1095 is without a bearing and is fixed to the shaft, while the section at the hub 1091 has a bearing; its angle of rotation is limited by a cam stop 1098. The angle of rotation for sections between the hub and tip of the blade (1092-1094) are limited by flexible fiber or cables 1099 that interconnect each of these blade sections. At no flow conditions or at the middle transition point (FIG. 9 position 1), the entire blade assembly lies orthogonal to the axis of turbine rotation. With the force of downward flow, the blades rotate CCW. The blade-tip section 1095 rotates with the conical shaft 1097 until either of the end stops shown within FIGS. 8*a*, 9, 10 is reached. The inner blade section near the hub 1091 has a wider blade angle and continues to rotate in the CCW direction until the cam 1098, connected to this blade section, reaches the cam stop limit mounted on the conical shaft 1097. Once the stop limits of tip section 1095 and hub section 1091 are reached, the flexible fiber or cables 1099 within the compliant surface pull tight due to the fact that the moment resulting from water acting downward on the blades is applied to the middle sections. The process reverses for upward flow movement, with the cables flexing during transition, while pulling tight at the extreme stop limits of the blades.

Figure 11B:
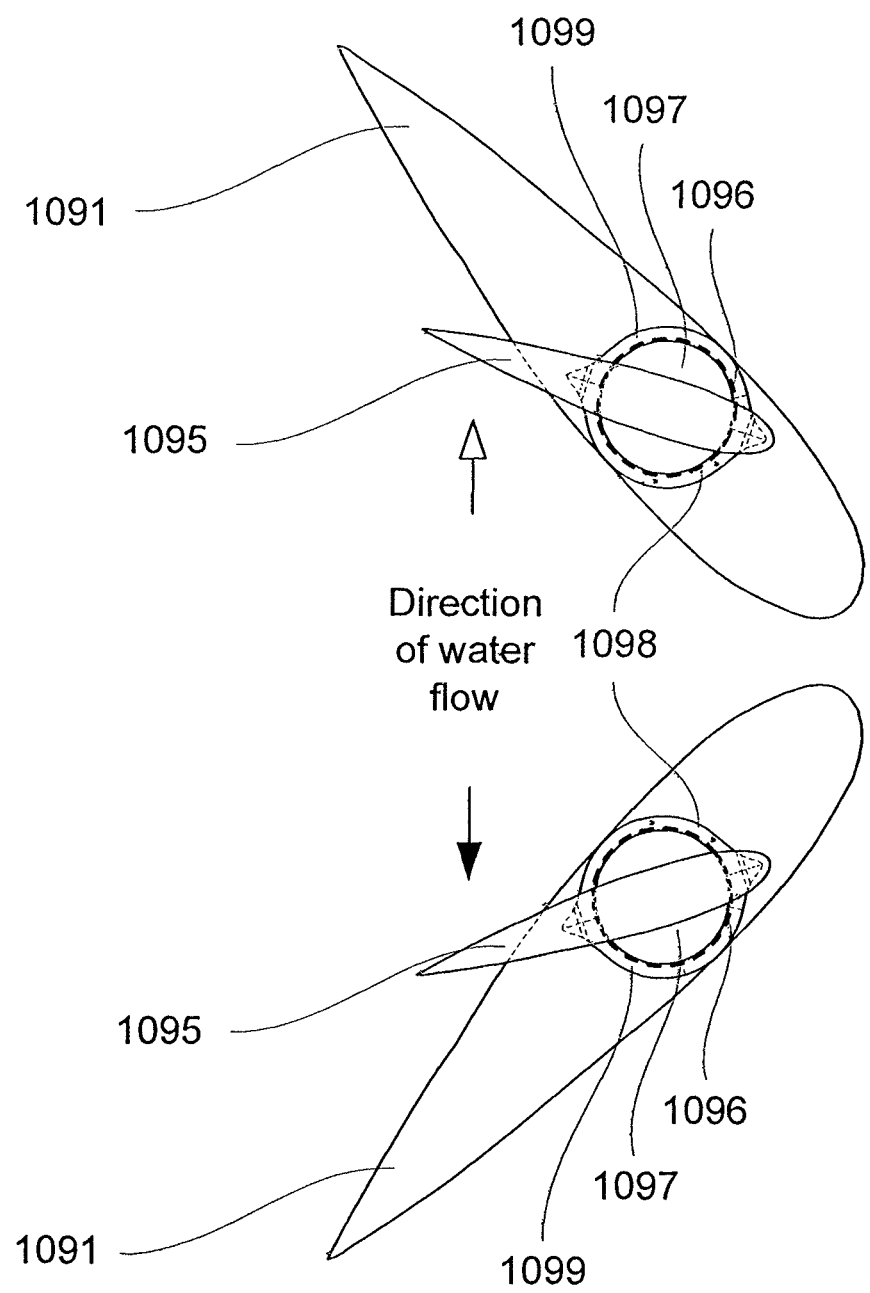
FIG. 11b shows a side profile of the self-pivoting, morphing blade sections near the hub and near the tip for each flow direction.

In FIG. 11b, a side profile of the section near the hub 1091 and tip section 1095 are shown for each flow direction. The blade angle of the hub section 1091 relative to the horizontal axis is always greater than that at the tip section 1095 due to the slower blade velocity at the hub than at the tip of the blade. In FIG. 11b, rotation of the cam 1098 can also be observed with the three dots indicating that cam 1098 is attached to section 1091, while the cam stop 1099 is attached to the conical shaft 1097. The bearing 1096 for the hub section 1091 is also shown. Therefore, by constructing the turbine with self-pivoting blades with variable end-stops and a twisted compliant surface, the turbine is very amenable to a changing wave environment and thus, to maximize power output.

It is to be understood that many modifications and variations may be devised given the above described principles of the invention. It is intended that all such modifications and variations be considered as within the spirit and scope of this invention, as defined in the following claims.

The invention claimed is:

1. In a wave energy conversion device having a submerged horizontally-aligned structure provided with a central opening for inducing a bidirectional fluid flow into and from the central opening in the submerged structure, the improvement of a bidirectional axial flow turbine with self-pivoting blades positioned in the central opening of the submerged structure comprising:

entry and exit sets of inner guide vanes positioned on opposite ends of the vertically-aligned sides of the central opening, for directing the bidirectional fluid flow through the central opening and inducing a vortex swirl in the bidirectional fluid flow such that rotation of the fluid within the central opening rotates in the same direction;

a turbine hub on a turbine shaft mounting a plurality of blades that are uniformly spaced around a circumference of the hub, said blades having a foil profile that is the same for both fluid flow directions;

wherein the plurality of blades are coupled to a rotating shaft of a pivot mechanism to have self-pivoting movement in response to axial flow forces of the water acting on the blades so as to adjust their blade angle so that the turbine shaft turns in the same rotational direction in both directions of axial water flow.

2. The improvement turbine with self-pivoting blades of claim 1, wherein said turbine has a rotational axis that is vertical and the plurality of blades are arranged symmetrically that when in still water are in a balanced configuration in a horizontal plane that lies orthogonal to the vertical turbine axis.

3. The improvement turbine with self-pivoting blades of claim 1, wherein the pivot mechanism for the plurality of blades is located in the turbine hub.

4. The improvement turbine with self-pivoting blades of claim 1, wherein the plurality of blades are driven in self-pivoting movement only by the bidirectional axial flow of water.

5. The improvement turbine with self-pivoting blades of claim 1, wherein the self-pivoting blades are designed to twist along a length of the blade in one direction of fluid flow and then twist into a different configuration for reverse fluid flow.

6. In a wave energy conversion device having a submerged horizontally-aligned structure provided with a central opening for inducing a bidirectional fluid flow into and from the central opening in the submerged structure, the improvement of a bidirectional axial flow turbine with self-pivoting blades positioned in the central opening of the submerged structure comprising:

entry and exit sets of inner guide vanes positioned on opposite ends of the vertically-aligned sides of the central opening, for directing the bidirectional fluid flow through the central opening and inducing a vortex swirl in the bidirectional fluid flow such that rotation of the fluid within the central opening rotates in the same direction;

a turbine hub on a turbine shaft mounting a plurality of blades that are uniformly spaced around a circumference of the hub, said blades having a blade profile that is the same for both fluid flow directions;

wherein the plurality of blades are coupled to a pivot mechanism to have self-pivoting movement in response to axial flow forces of the water acting on the blades so as to adjust their blade angle so that the turbine shaft turns in the same rotational direction in both directions of axial water flow, wherein the self-pivoting movement of the blades is converted by the pivot mechanism into end-stop travel movement of an end-stop inner shaft between opposite end-stop positions defined by an end-stop mechanism.

7. The improvement turbine with self-pivoting blades of claim 6, wherein said end-stop mechanism is located within the turbine hub.

8. The improvement turbine with self-pivoting blades of claim 6, wherein said end-stop mechanism is located outside the turbine hub and the pivot mechanism for the blades has an inner shaft extension extending through a hollow core of the turbine shaft with an end coupled to the external end-stop mechanism.

9. The improvement turbine with self-pivoting blades of claim 6, wherein said end-stop mechanism has end-stop members for defining the end-stop positions for the pivoting of the blades which can be variably positioned to define optimal blade angles for the blades relative to the bidirectional axial flow of water.

10. The improvement turbine with self-pivoting blades of claim 9, wherein said end-stop members are coupled to motor drives for positively moving the end-stop members to variable end-stop positions corresponding to optimal blade angles for the blades.

11. A turbine with self-pivoting blades for converting bidirectional axial flow of water into rotation of a turbine shaft comprising:

a turbine hub on a turbine shaft mounting a plurality of blades that are uniformly spaced around a circumference of the hub, said blades having a foil profile that is the same for both fluid flow directions;

wherein the plurality of blades are coupled to a rotating shaft of a pivot mechanism for self-pivoting movement in response to axial flow forces of the water acting on the blades so as to adjust their blade angle so that the turbine shaft turns in the same rotational direction in both directions of axial water flow.

12. The turbine with self-pivoting blades of claim 11, wherein said turbine has a rotational axis that is vertical and the plurality of blades are arranged symmetrically that when in still water are in a balanced configuration in a horizontal plane that lies orthogonal to the vertical turbine axis.

13. The turbine with self-pivoting blades of claim 11, wherein the pivot mechanism for the plurality of blades is located in the turbine hub.

14. The turbine with self-pivoting blades of claim 11, wherein the plurality of blades are driven in self-pivoting movement only by the bidirectional axial flow of water.

15. A turbine with self-pivoting blades for converting bidirectional axial flow of water into rotation of a turbine shaft comprising:
 a turbine hub on a turbine shaft mounting a plurality of blades that are uniformly spaced around a circumference of the hub, said blades having a blade profile that is the same for both fluid flow directions;
  a pivot mechanism coupled to the plurality of blades for self-pivoting movement in response to axial flow forces of the water acting on the blades so as to adjust their blade angle so that the turbine shaft turns in the same rotational direction in both directions of axial water flow,
  wherein the self-pivoting movement of the blades is converted by the pivot mechanism into end-stop travel movement of an end-stop inner shaft between opposite end-stop positions defined by an end-stop mechanism.

16. The turbine with self-pivoting blades of claim 15, wherein said end-stop mechanism is located within the turbine hub.

17. The turbine with self-pivoting blades of claim 15, wherein said end-stop mechanism is located outside the turbine hub and the pivot mechanism for the blades has an inner shaft extension extending through a hollow core of the turbine shaft with an end coupled to the external end-stop mechanism.

18. The turbine with self-pivoting blades of claim 15, wherein the self-pivoting blades are designed to twist along a length of the blade in either of two respective twist configurations corresponding with changes in flow direction.

19. The turbine with self-pivoting blades of claim 15, wherein the self-pivoting movement of the blades is converted by the pivot mechanism into bidirectional up and down linear movement of the end-stop inner shaft to move a stop member between opposite end-stop positions.

20. The turbine with self-pivoting blades of claim 15, wherein the self-pivoting movement of the blades is converted by the pivot mechanism into bidirectional rotational movement of the end-stop inner shaft to move a stop member between opposite end-stop positions.

21. The turbine with self-pivoting blades of claim 15, wherein said end-stop mechanism has end-stop members for defining the end-stop positions for the pivoting of the blades which can be variably positioned to define optimal blade angles for the blades relative to the bidirectional axial flow of water.

22. The turbine with self-pivoting blades of claim 21, wherein said end-stop members are coupled to motor drives for positively moving the end-stop members to variable end-stop positions corresponding to optimal blade angles for the blades relative to the bidirectional axial flow of water.

23. The turbine with self-pivoting blades of claim 22, wherein said motor drives have sufficient power for moving the end-stop members when in contact with a stop member fixed on the end-stop inner shaft to positively move the stop member and end-stop inner shaft to desired end-stop positions corresponding to optimal blade angles for the blades relative to the bidirectional axial flow of water.

* * * * *